US011343262B2

(12) United States Patent
Junod et al.

(10) Patent No.: US 11,343,262 B2
(45) Date of Patent: May 24, 2022

(54) PORT SCANNING

(71) Applicant: NAGRAVISION S.A., Cheseaux-sur-Lausanne (CH)

(72) Inventors: Antoine Junod, Cheseaux-sur-Lausanne (CH); Pablo Palomero, Cheseaux-sur-Lausanne (CH); Adrien Giner, Cheseaux-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 276 days.

(21) Appl. No.: 16/347,228

(22) PCT Filed: Oct. 20, 2017

(86) PCT No.: PCT/EP2017/076921
§ 371 (c)(1),
(2) Date: May 3, 2019

(87) PCT Pub. No.: WO2018/082947
PCT Pub. Date: May 11, 2018

(65) Prior Publication Data
US 2020/0059480 A1    Feb. 20, 2020

(30) Foreign Application Priority Data
Nov. 4, 2016 (EP) .................... 16197436

(51) Int. Cl.
*H04L 29/06* (2006.01)
(52) U.S. Cl.
CPC ...... *H04L 63/1416* (2013.01); *H04L 63/1425* (2013.01); *H04L 63/1433* (2013.01)
(58) Field of Classification Search
CPC ............. H04L 63/1416; H04L 63/1425; H04L 63/1433
See application file for complete search history.

(56) References Cited

U.S. PATENT DOCUMENTS

| 7,512,980 B2 * | 3/2009 | Copeland ............ H04L 63/1416 705/51 |
| 7,664,855 B1 * | 2/2010 | Freed .................. H04L 63/1466 709/225 |

(Continued)

OTHER PUBLICATIONS

Thompson J., "Scanning IPS-Protected Networks with Nessus", 'https://www.securityevaluators.com/knowledge/papers/nessus/', Apr. 30, 2016.

*Primary Examiner* — Sarah Su
(74) *Attorney, Agent, or Firm* — Hoyng Rokh Monegier BV; David P. Owen

(57) ABSTRACT

A method of scanning a plurality of ports at one or more target IP addresses is disclosed. Each of the plurality of ports corresponds to a port number at one of the one or more target IP addresses, for example an IPv4 or IPv6 address. The method comprises assigning each port to one of a plurality of sets of ports and executing a plurality of port scanning processes at the same time on a common source machine (virtual or physical). Each port scanning process sends port probe requests to the ports of a respective set of the plurality of sets from a different respective source IP addresses. Thus, a different respective source IP address is associated with each set of the plurality of sets of ports, different from the source IP addresses associated with the remaining sets, and each set of target IP addresses receives probe requests from a different respective source IP address. The sets may be aligned with target addresses or may spread several target addresses or only part of the ports of a target address. For example, one or more of the plurality of port scanning processes may send port probe requests to more than one target IP address and/or two or more of the plurality of port scanning processes may send port probe requests to the same target IP address.

13 Claims, 5 Drawing Sheets

(56) References Cited

U.S. PATENT DOCUMENTS

| | | | |
|---|---|---|---|
| 7,962,957 B2* | 6/2011 | Keohane | H04L 63/126 726/23 |
| 9,166,883 B2 | 10/2015 | Marchese | |
| 2005/0147037 A1* | 7/2005 | Maimon | H04L 63/1425 370/230 |
| 2005/0229255 A1 | 10/2005 | Gula et al. | |
| 2006/0193300 A1* | 8/2006 | Rawat | H04W 24/00 370/338 |
| 2007/0033650 A1* | 2/2007 | Grosse | H04L 63/1458 726/22 |
| 2009/0259748 A1 | 10/2009 | McClure et al. | |
| 2016/0014156 A1* | 1/2016 | Roosli | H04L 63/0209 726/1 |
| 2016/0127390 A1 | 5/2016 | Lai et al. | |
| 2016/0164910 A1* | 6/2016 | Tang | H04L 63/1458 726/14 |
| 2017/0171221 A1* | 6/2017 | Ho | G06F 21/552 |
| 2018/0004948 A1* | 1/2018 | Martin | G06F 21/566 |

* cited by examiner

PORT SCANNING

FIELD

The present disclosure relates to scanning ports on one or more target IP addresses, in particular although not exclusively belonging to a network monitored for port scanning of IP addresses in the network by a security appliance.

BACKGROUND

In the context of Internet Protocol (IP) networks, port scanning is a technique to determine open ports (ports that are listening for incoming packets) on one or more host machines by sending requests (individual packets or a sequence of packets) to ports at the machine and analysing any response or lack thereof to determine if the port in question is open. Used maliciously, port scanning can be done to detect open ports that can be attacked but there are also legitimate uses of port scanning, for example to detect vulnerabilities in a network with a view to fixing them or simply to map the network. Typical large organizations can have up to one million or more IP addresses distributed on possibly dozen of different geographic locations around the planet (hereafter the perimeter), each with its own network security appliances setup to block port scanning activities. Hourly or daily port scans of such a perimeter can facilitate the detection of malicious activities, such as malwares, viruses, botnets and others, and also may allow to identify process gaps, that is gaps in security processes that may lead to vulnerabilities, and other threats. An example of a process gap is where a process rule or supervisor ask IT staff to close a service and IT staff fails to take action so that the service is not closed and remains open to attack. However, for large organizations it is often unfeasible for technical, organizational or operational reasons to configure their network security appliances to allow an ethical port scanning solution provider to launch regular port scans. Therefore, even such a legitimate provider may need to use stealth techniques to port scan undetected.

Public or internal networks often guard against port scanning by using security appliances, for example a firewall, to detect and block port scanning activities based on an analysis of network traffic. Herein, it will be understood that the security appliance may take many forms and may be implemented on a dedicated machine, physical or virtual, or as a process running on a shared machine or server. Existing port scanning techniques try to evade detection by sending network packets at a low rate, below a limit at which the security appliance identifies suspicious traffic. For example, a typical stealth port scan, such as a scan using the nmap software (nmap.org) with default settings, running on 1025 ports of a single target host with 1 minute between each packet, would require more than 17 hours to terminate. When scanning multiple targets protected by the same network security appliance, the time required is proportional to the number targets. For example, port scanning 1025 ports of two targets standing behind a common network security appliance setup to block port scanning activities would require 37 hours. Port scanning a typical/24 network with 256 public IP addresses protected by a security appliance setup to block port scanning activities in this way would require about 6 months at this rate.

BRIEF DESCRIPTION OF THE DRAWINGS

The present disclosure relates to port scanning techniques, some embodiments of which are described below by way of example to illustrate aspects and embodiments of the disclosure with reference to the accompanying drawings, in which.

DETAILED DESCRIPTION OF THE DRAWINGS

Figure 1:
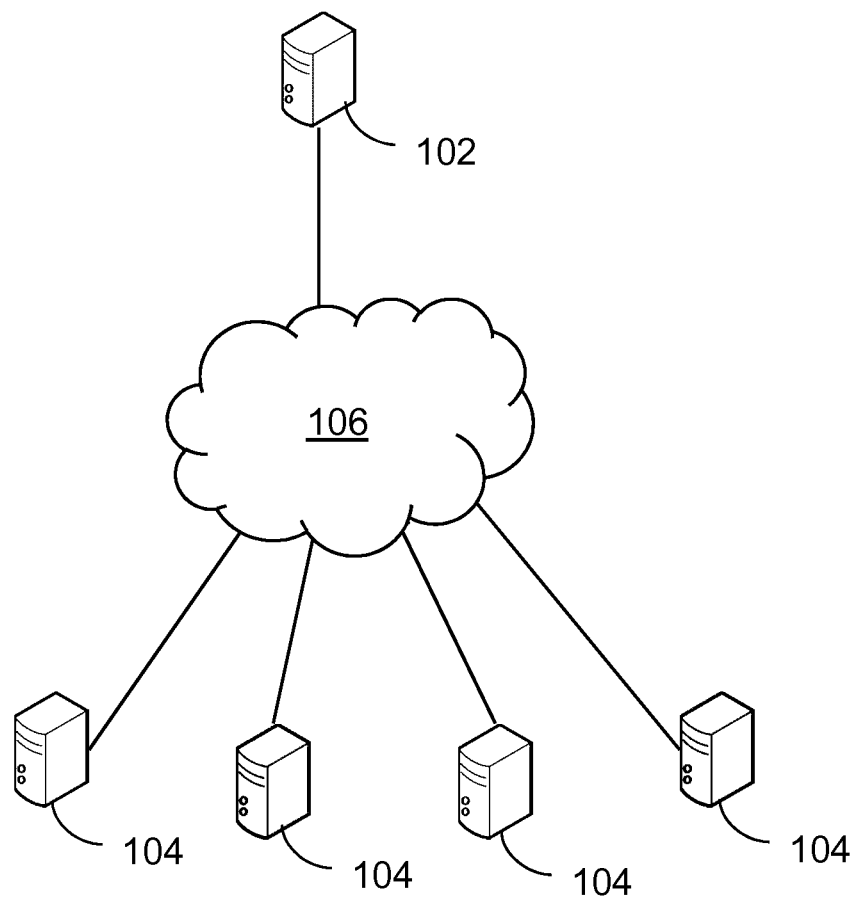
FIG. 1 illustrates a port scan host in a network environment.

In overview, port scanning techniques are provided that reduce the time it takes to execute a port scan on a given number of ports by parallelising port scan processes running on a single machine, for example a single server, each process sending probes from a different respective source IP address.

In some aspects, a method of scanning a plurality of ports at one or more target IP addresses is disclosed. Each of the plurality of ports corresponds to a port number at one of the one or more target IP addresses, for example an IPv4 or IPv6 address. The method comprises assigning each port to one of a plurality of sets of ports and executing a plurality of port scanning processes at the same time on a single common source machine (virtual or physical). Each port scanning process sends port probe requests to the ports of a respective set of the plurality of sets from a different respective source IP addresses. Thus, a different respective source IP address is associated with each set of the plurality of sets of ports, different from the source IP addresses associated with the remaining sets, and each set of target IP addresses receives probe requests from a different respective source IP address. The sets may be aligned with target addresses or may spread several target addresses or only part of the ports of a target address. For example, one or more of the plurality of port scanning processes may send port probe requests to more than one target IP address and/or two or more of the plurality of port scanning processes may send port probe requests to the same target IP address.

By splitting the target ports into sets and scanning the ports in each set from a different IP address, the port scan processes can be executed in parallel, as they will appear to be independent of each other to a security appliance protecting the hosts at the target IP addresses. Consequently, by having X processes run in parallel, the overall scan time can typically be reduced by a factor of X without detection by the security appliance. Since the processes run on a common machine, synchronisation between the processes is facilitated, avoiding any synchronisation overhead that may be required if processes ran on multiple machines. It will be understood that processes are executed at the same time/in parallel so that their execution overlaps in time. In some embodiments, the overlap may be complete, i.e. the processes may start and end at the same time. In other embodiments, overlap may be incomplete, for example the start or end times, or both, may be different.

The one or more target IP addresses may be part of a network monitored by a security appliance for port probe requests to IP addresses in the network and each of the plurality of port scanning processes may send port probe requests at a respective probe rate, which may be different or the same across processes. For example, the security appliance may identify traffic as suspicious if port probe requests are received with a time of less than a threshold time between port probe requests and the probe rates may be set to be less than or equal to the inverse of the threshold time. In another example, the security appliance may identify traffic as suspicious if packets are received by the network from a source IP address at a rate of more than a source threshold rate and the probe rates may be set to less than or equal to the source threshold rate. In yet another example, the security appliance may identifies traffic as suspicious if packets are received at an IP address in the network at a rate of more than a destination threshold rate and the probe rate for each port scan process may be set to less than or equal to the destination threshold rate divided by a share factor for the respective port scan process. The share factor for a port scan process is based on the (total) number of port scan processes sending probe requests to any one of the target addresses the respective port scan process sends probe requests to. The share factor may for example be the total number for each process in question so that each process has its own probe rate or it may be the maximum of the respective total numbers of all processes to determine a single probe rate for all processes. It will be appreciated that the security appliance may employ any combination of one or more of the above tests and that the method may take account of any combination of one or more of the above thresholds to determine the probe rate, for example as less than or equal to the lowest of two or three of the thresholds.

In some embodiments, the method comprises varying one or more of a delay between probe requests, a number of IP addresses from which probe requests are send to the network and a number IP addresses in the network to which probe requests are sent to determine parameters the security appliance uses to identify suspicious traffic. In this way, the security appliance can be characterised and/or a detection limit can be established for the rate at which each process can send scan requests The port probe requests may be based on TCP requests, for example connect (using a system call/socket API call to create a TCP connection), SYN (sending a TCP packet with the SYN bit set in the header but not establishing a connection), NULL (sending a TCP packet with no control bits set in the header), FIN (sending a TCP packet with SYN, RST and ACK not set and the FIN bit set in the header), XMAS (sending a TCP packet with SYN, RST and ACK not set and the FIN, PSH and URG bits set in the header), ACK (only the ACK bit set, used to determine if the port is filtered by a security appliance, rather than if it is open), custom scans with other combinations of control bits set, and the like. The port probe requests may instead or additionally be based on other protocols, for example sending UDP, SCTP or ICMP packets or the like.

Aspects of the disclosure also extend to a computer program product comprising coded instructions that, when executed on a computing device, implement a method as described and one or more computer readable media carrying coded instructions that, when executed on a computing device, implement a method as described. Further aspects extend to a computer system comprising means for implementing a method as described and to a system comprising a memory for storing target addresses, sets and source addresses and a processor configured to implement a method as described.

Some specific embodiments are now described with reference to the accompanying drawings, by way of example to illustrate the disclosed aspects and embodiments. With reference to FIG. 1, a port scan host 102 is connected to a plurality of target hosts 104, each associated with an IP (IPv4 or IPv6) address, over an IP network 106, such as the Internet. The target hosts 104 are protected by a common security appliance (not shown), for example are placed behind a firewall.

Figure 2:
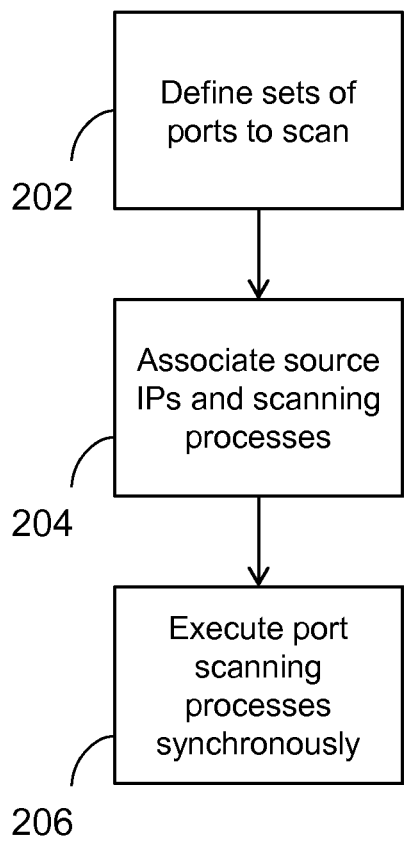
FIG. 2 illustrates a method of scanning ports.

The port scan host 102 is configured to send port scan probe requests to individual ports, for example individual probe packets or a sequence of packets establishing a connection using a socket API or other system call, to the target hosts 104. Probe packets may be TCP packets with different settings of the control bits, for example a SYN packet with only the SYN control bit set. Other embodiments use different TCP packets with different control bit settings or packets in accordance with different protocols, such as UDP, SCTP or ICMP. The port scan host is further configured to listen for a response from the ports in question to determine a state of each of the ports. For example, in case of a SYN probe, a SYN/ACK response indicates that the port is open, a RST response indicates that the port is closed and no response indicates that the probe packet has been filtered/blocked by the security appliance. In some embodiments, sending the port scan probe requests involves making a system/socket API call to connect to the port in question and the port scan host 102 is configured to interrogate the connection status, for example using the socket API. The port scan host has a plurality of source IP addresses available from which to send port scan probe requests. Each source IP address is a valid, global IP address assigned to the port scanning machine With reference to FIG. 2, a process for scanning a plurality of ports on one or more target host 104 is now described. At step 202, the port scan hosts 102 takes as input the network to scan, that is the one or more target hosts 104 (IP addresses) to scan and the port numbers of the ports to scan. Of course, different port numbers can be specified for each target host 104, in some embodiments. The total set of ports to scan (that is the ports to scan on each target host 104 for all targets hosts 104) is split into sets of ports. At step 204, a respective source IP is associated with each set of ports, so that each set receives port scan requests from a different source IP. At step 206, the port scan host 102 executes a plurality of port scanning processes in parallel. Each port scanning process sends port scanning probe requests, discussed above, from a corresponding source IP address to the ports of a corresponding one of the set of ports. By parallelising the scanning of ports using different source IP addresses, the time taken to scan a given set of ports is reduced in proportion to the number of scanning processes/source IP addresses used.

Figure 3A:
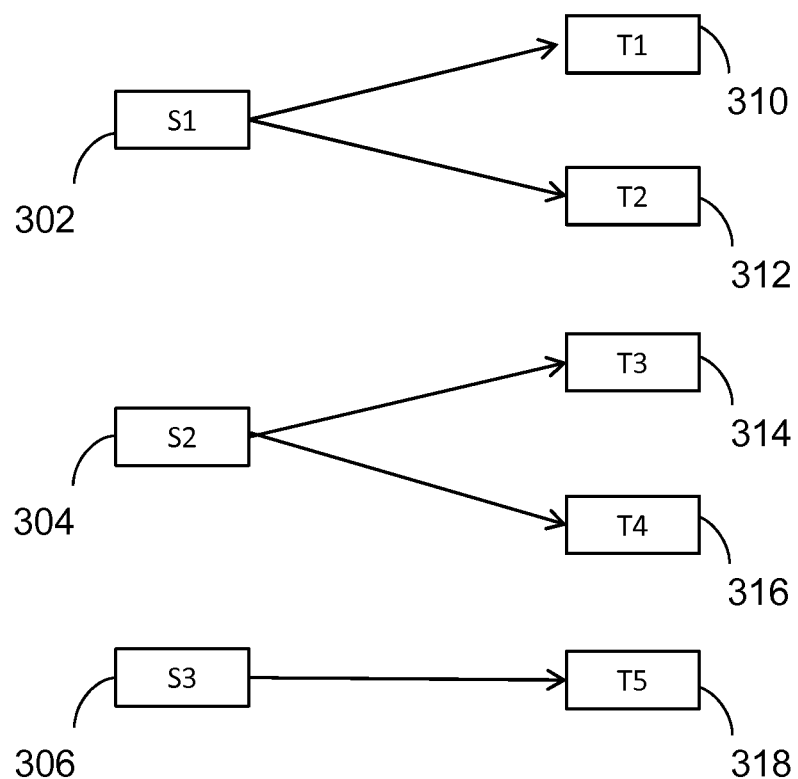
FIGS. 3A and 3B illustrate configurations of scan processes implemented on the port scan host in accordance with the method in relation to target IP addresses being scanned.
Figure 3B:
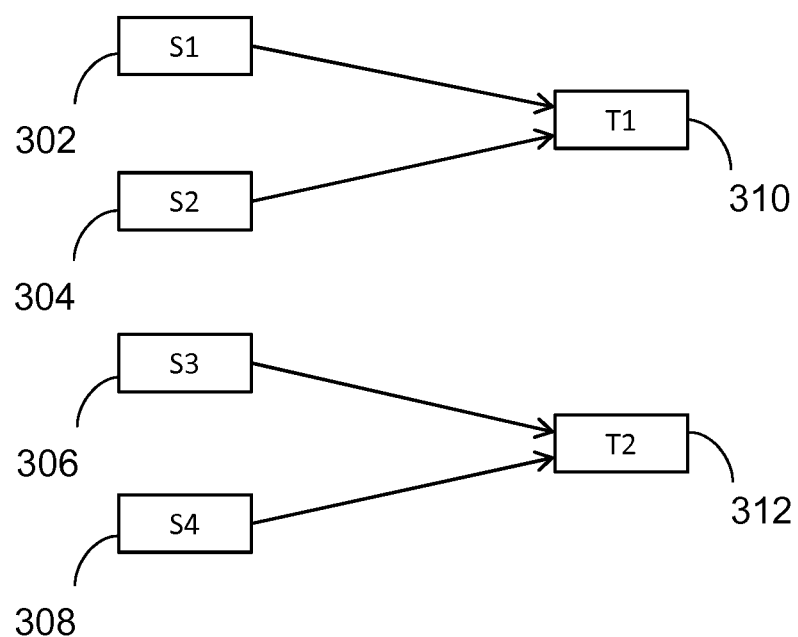

Examples of the assignments of port scan processes/IP addresses to target ports are now described with reference to FIGS. 3A and 3B. In the example of FIG. 3A, there are X=3 port scan processes 302, 304 and 306, each with their own source IP address, and N=5 target IP addresses 310, 312, 314, 316 and 318. Process 302 scans all ports at each of target addresses 310, 312; process 304 scans all ports at each of target addresses 314, 316; and process 306 scans all ports of target address 318. In the example of FIG. 3B, there are X=4 port scan processes/source IP addresses and N=2 target IP addresses. As there are more target IP addresses than port scan processes, each target IP address is scanned by more than one port scan process. Specifically, port scan process 302 scans half of the ports of target IP address 310, say port numbers 1 to 512, and port scan process 304 scans the other half of the ports of target IP address 310, say port numbers 513 to 1025. Port scan process 306 scans half of the ports of target IP address 312, say port numbers 1 to 512, and port scan process 308 scans the other half of the ports of target IP address 312, say port numbers 513 to 1025. In such a scenario each target is shared by two port scan processes, or in other words has a share factor of share_factor=2, discussed below. In the previous example, share_factor=1. In general, share_factor for a given port scan process is (or is proportional to) the number of port scan processes sending probe requests to any one of the target addresses the given port scan process sends probe requests to. The number may be the same for all processes and target addresses or may vary from one process to the next and/or from one target address to the next within each process or across processes. Accordingly, in the latter cases, share_factor may be set the same for all processes and target addresses, for example set as the maximum of the individual values, or may be allowed to vary between processes and/or target addresses.

In some embodiments, each port scan process sequentially sends probe requests at a probe rate, that is the rate at which, probe packets are sent. In the case of a connect scan, it will be understood that the probe rate is the rate of SYN packets sent. The highest probe rate at which any one process can send probe requests without being detected will depend on detection limits applied by the security appliance: one or more of a limit on the packets per second per source IP (source_rate), a limit on the packets per second to a destination IP (destination_rate) and how much time (in milliseconds) is needed between probes to avoid traffic being considered a port scan (interpacket_delay). These parameters can be found in the management interfaces of many security appliance. If unknown, the port scan host may attempt to determine the parameters empirically, as described below, or the following defaults may be used: source_rate=4000 packets per second (PPS), destination_rate=4000PPS, interpacket_delay=6 ms.

In some embodiments, the probe packet rate (safe_pps) that avoids detection is determined given the following constraints:
 safe_pps<=source_rate
 safe_pps<=destination_rate/share_factor
 safe_pps<=1000/interpacket_delay (in ms)

For example, safe_pps may be set as the least of source_rate, destination_rate/share_factor and the inverse of interpacket_delay (scaled appropriately to account of units). In the example of FIG. 3B, both target IP addresses 310, 312 are shared by the same number of processes, two in each case, with each process sharing with one other process. Thus the share factor is the same for all processes and hence all processes can use the same probe rate. Where different processes share with different numbers of other processes, the share factor may vary from one process to the next. In this case, each process may have its own share factor, or a single probe rate can be determined for all processes, for example using the maximum value of all share factors.

Figure 4:
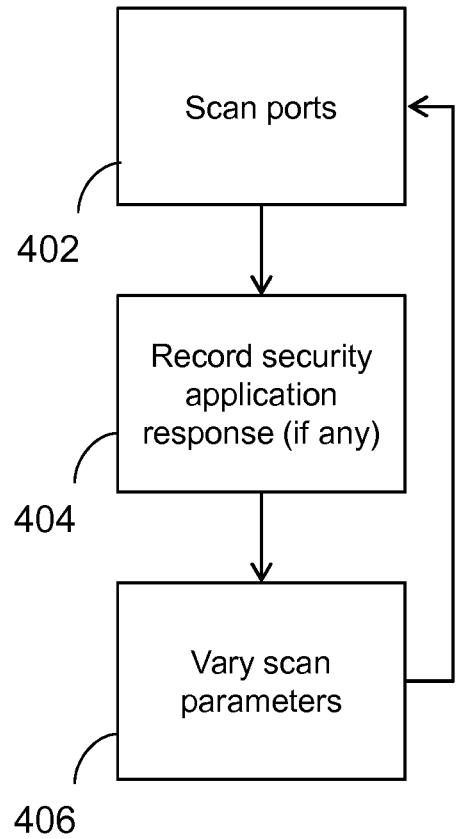
FIG. 4 illustrates a method of determining parameters of a security appliance or determining a probe rate for use in the method.

With reference to FIG. 4, a method for estimating parameters of the security appliance, in case that they are unknown, and/or for estimating a probe rate is now described with reference to FIG. 4. At step 406 a port scan is carried out with a certain setting of probe rate, number X of processes and configuration of process/port relationships, for example captured by a setting of the share_factor value, thereby carrying out a scan with a certain setting of packet rates from each source and to each destination, as well as inter-probe delays. At step 404 a response of the security appliance is recorded, for example noting whether a positive or negative response to the probe requests of the scan was received or whether no response was received (indicating that the probe request was filtered by the security appliance). At step 406 the scan parameters are varied and the method loops back to step 402. Over the iterations of the method, information is gained on the parameters, for example one or more of interpacket_delay, source_rate and destination_rate, employed by the security appliance. This information is then, in some embodiments, used to set the probe rate and/or configuration of the processes at the port scanning host 102. In some embodiments, the sets of target ports are fixed for each process and the only parameter that is varied at step 406 is the probe rate. The probe rate may, for example, be increased on each iteration of the method until the probe requests are blocked by the security appliance and the probe rate of the previous iteration may then be used for future port scans. In these embodiments, rather than determining parameters of the security appliance, an optimal or near-optimal probe rate is determined for a given setting.

Using one or more of the described approaches, it has been found that the probe rate can be set, in certain environments, to as high as $(6\ ms)^{-1}$, sending a probe about every 6 ms, without being blocked by security appliances. This can result in a further significant time reduction, in addition to that obtained by parallelisation, as compared to a conventional inter-probe interval of 1 minute.

Figure 5:
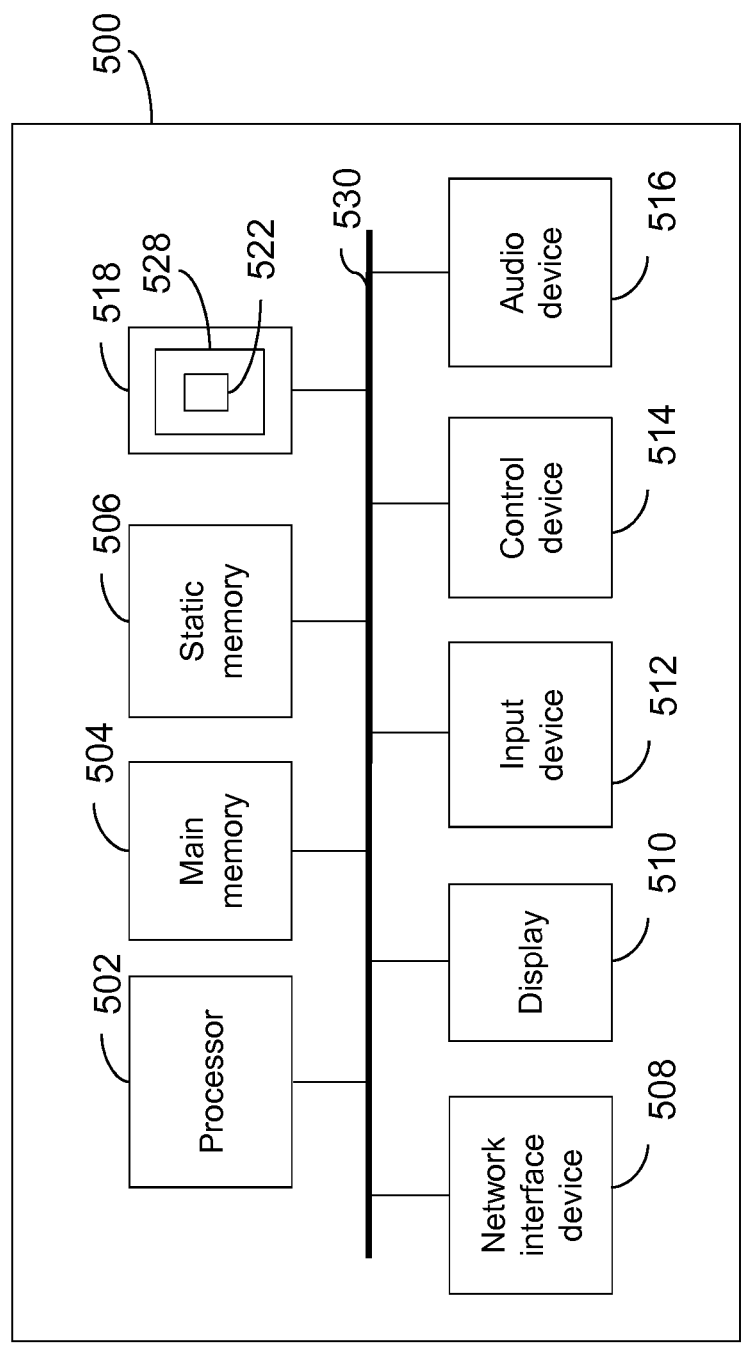
FIG. 5 illustrates a computing device used in some implementations of the described methods.

FIG. 5 illustrates a block diagram of one implementation of a computing device 500 within which a set of instructions, for causing the computing device to perform any one or more of the methodologies discussed herein, may be executed, for example implementing the functions of the port scan host 102. The computing device may be a personal computer (PC), a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an appliance specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard or touchscreen), a cursor control device 514 (e.g., a mouse or touchscreen), and an audio device 516 (e.g., a speaker).

The data storage device 518 may include one or more machine-readable storage media (or more specifically one or more non-transitory computer-readable storage media) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "assigning", "determining", "comparing", "enabling", "executing", "associating", "identifying", "sending", "associating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of scanning a plurality of ports at one or more target IP addresses, each of the plurality of ports corresponding to a port number at one of the one or more target IP addresses, wherein the one or more target IP addresses are part of a network monitored for port probe requests to IP addresses in the network by a security appliance and wherein the method comprises:
   assigning each port to one of a plurality of sets of ports; and
   executing, on a common machine, a plurality of port scanning processes at the same time, wherein each port scanning process sends port probe requests to the ports of a respective set of the plurality of sets from a different respective source IP addresses,
   wherein each of the plurality of port scanning processes sends port probe requests to the ports of the respective set at a respective probe rate, and
   wherein the security appliance identifies traffic as suspicious if packets are received by the network from a source IP address at a rate of more than a source threshold rate and the probe rates are less than or equal to the source threshold rate.

2. The method according to claim 1, wherein the method comprises varying one or more of a delay between probe requests, a number of IP addresses from which probe requests are sent to the network and a number IP addresses in the network to which probe requests are sent to determine parameters the security appliance uses to identify suspicious traffic.

3. The method according to claim 1, wherein one or more of the plurality of port scanning processes sends port probe requests to more than one target IP address.

4. The method according to claim 1, wherein two or more of the plurality of port scanning processes send port probe requests to the same target IP address.

5. The method according to claim 1, wherein the port probe requests are TCP requests.

6. The method according to claim 1, wherein the port probe requests each comprises one or more packets used in establishing a connection to the target port.

7. The method according to claim 6, wherein each of the probe requests establishes a connection to the target port.

8. A computer program product comprising coded instructions that, when executed on a computing device, implement a method according to claim 1.

9. One or more computer readable non-transitory media carrying coded instructions that, when executed on a computing device, implement a method according to claim 1.

10. A computer system comprising means for implementing a method according to claim 1.

11. A port scanning host machine comprising computing infrastructure configured to implement a plurality of port scanning processes in accordance with a method according to claim 1.

12. A method of scanning a plurality of ports at one or more target IP addresses, each of the plurality of ports corresponding to a port number at one of the one or more target IP addresses, wherein the one or more target IP addresses are part of a network monitored for port probe requests to IP addresses in the network by a security appliance and wherein the method comprises:

assigning each port to one of a plurality of sets of ports; and executing, on a common machine, a plurality of port scanning processes at the same time, wherein each port scanning process sends port probe requests to the ports of a respective set of the plurality of sets from a different respective source IP addresses, wherein each of the plurality of port scanning processes sends port probe requests to the ports of the respective set at a respective probe rate, and wherein the security appliance identifies traffic as suspicious if port probe requests are received with a time of less than a threshold time between port probe requests and the probe rates are less than or equal to the inverse of the threshold time.

13. A method of scanning a plurality of ports at one or more target IP addresses, each of the plurality of ports corresponding to a port number at one of the one or more target IP addresses, wherein the one or more target IP addresses are part of a network monitored for port probe requests to IP addresses in the network by a security appliance and wherein the method comprises:

assigning each port to one of a plurality of sets of ports; and executing, on a common machine, a plurality of port scanning processes at the same time, wherein each port scanning process sends port probe requests to the ports of a respective set of the plurality of sets from a different respective source IP addresses, wherein each of the plurality of port scanning processes sends port probe requests to the ports of the respective set at a respective probe rate, and wherein the security appliance identifies traffic as suspicious if packets are received at an IP address in the network at a rate of more than a destination threshold rate and the probe rate for each port scan process is less than or equal to the destination threshold rate divided by a share factor for the respective port scan process, wherein the share factor is based on the number of port scan processes sending probe requests to any one of the target addresses the respective port scan process sends probe requests to.

* * * * *